United States Patent [19]

Ito

[11] Patent Number: 5,454,541
[45] Date of Patent: Oct. 3, 1995

[54] SEAT SLIDING APPARATUS FOR A VEHICLE

[75] Inventor: Sadao Ito, Anjo, Japan

[73] Assignee: Aisin Seiki Kabushiki Kaisha, Japan

[21] Appl. No.: 281,141

[22] Filed: Jul. 27, 1994

Related U.S. Application Data

[63] Continuation of Ser. No. 15,925, Feb. 10, 1993, abandoned.

[30] Foreign Application Priority Data

Feb. 14, 1992 [JP] Japan ................................ 4-028426

[51] Int. Cl.⁶ ............................................... F16M 13/00
[52] U.S. Cl. ............................... 248/430; 248/345.1
[58] Field of Search ........................... 248/429, 430, 248/424, 345.1; 296/65.1; 297/340, 344.1

[56] References Cited

U.S. PATENT DOCUMENTS

| | | | |
|---|---|---|---|
| 3,022,976 | 2/1962 | Zia | 248/430 |
| 3,157,441 | 1/1964 | Pickles | 248/429 X |
| 3,184,209 | 5/1965 | Colautti | 248/429 |
| 4,515,404 | 5/1985 | Nishimura et al. | 248/429 X |
| 4,717,194 | 1/1988 | Ota et al. | 248/430 |
| 4,892,282 | 1/1990 | Suzuki et al. | 248/430 |
| 4,948,189 | 8/1990 | Terada et al. | 248/429 X |
| 5,048,886 | 9/1991 | Ito et al. | 248/430 X |
| 5,150,872 | 9/1992 | Isomura | 248/430 X |
| 5,167,393 | 12/1992 | Hayakawa et al. | 248/430 |
| 5,188,329 | 2/1993 | Takahara | 248/345.1 X |
| 5,207,473 | 5/1993 | Nawa et al. | 248/430 X |
| 5,275,369 | 1/1994 | Komata et al. | 248/345.1 |

FOREIGN PATENT DOCUMENTS

| | | | |
|---|---|---|---|
| 2715652 | 10/1978 | Germany | 248/430 |
| 4007857A1 | 9/1991 | Germany | |
| 0291234 | 12/1986 | Japan | 248/430 |
| 2-142335 | 12/1990 | Japan | |
| 8909707 | 10/1989 | WIPO | 248/430 |

Primary Examiner—Ramon O. Ramirez
Assistant Examiner—Korie H. Chan
Attorney, Agent, or Firm—Finnegan, Henderson, Farabow, Garrett & Dunner

[57] ABSTRACT

A seat sliding apparatus for mounting a seat of a vehicle, comprises: a pair of lower rails for fixing to a floor of the vehicle, each of the lower rails including an opening; a pair of upper rails for fixing to the seat of the vehicle and held slidably by the pair of lower rails through the openings; and a pair of plate members respectively fixed to the lower rails, each plate member covering at least a portion of each of the openings.

5 Claims, 3 Drawing Sheets

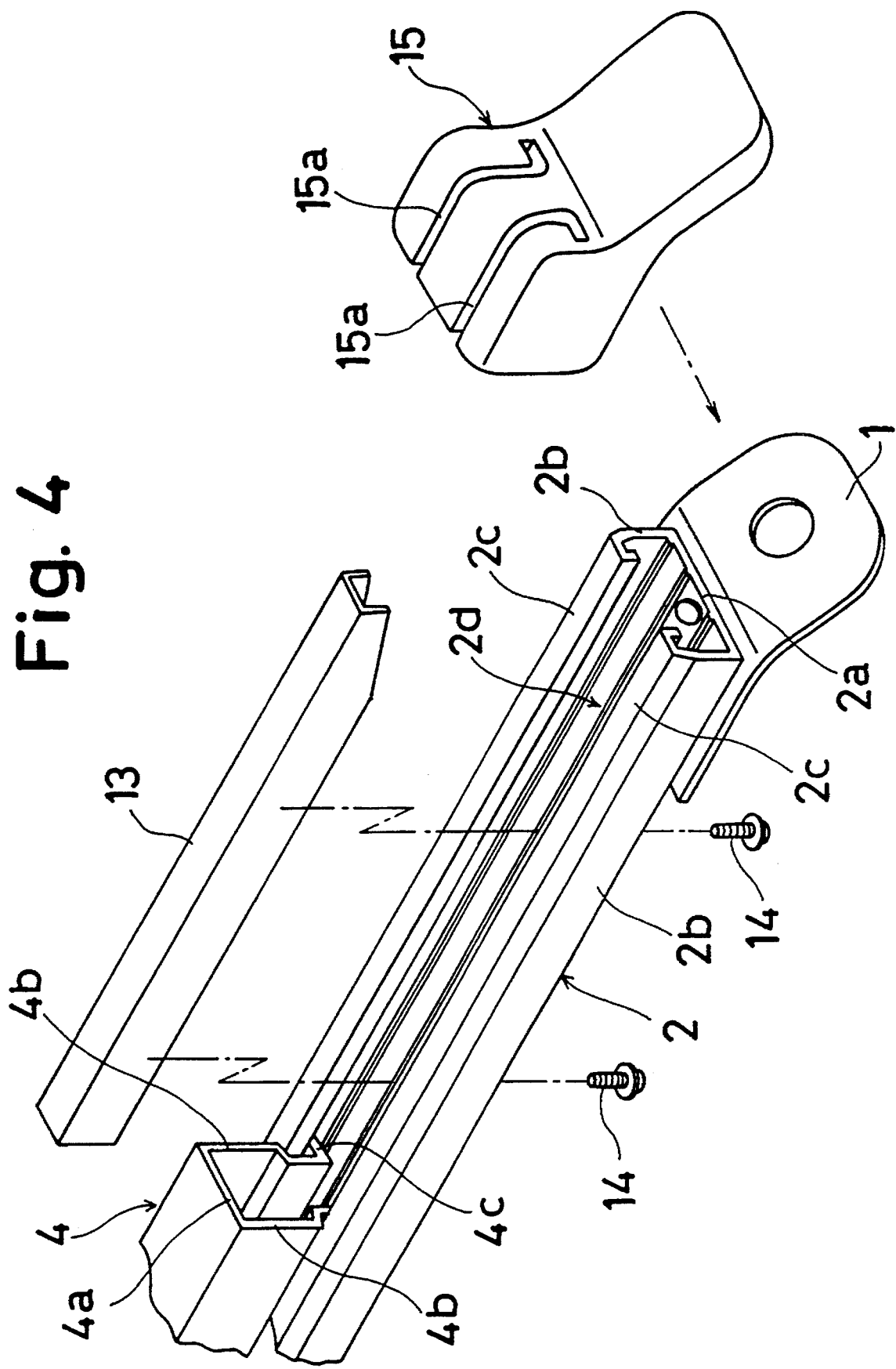

5,454,541

SEAT SLIDING APPARATUS FOR A VEHICLE

This application is a continuation of application Ser. No. 08/015,925, filed Feb. 10, 1993, now abandoned.

BACKGROUND OF THE INVENTION

1. Field of the invention

This invention relates to a seat sliding apparatus for a vehicle, which moves the seat of the vehicle forward and backward by driving power of an electric motor or operation of a passenger.

2. Description of the Related Art

A conventional seat sliding apparatus is disclosed in Japanese Utility Model publication No. 2-142335. The seat sliding apparatus disclosed in the prior art comprises a pair of lower rails fixed to a floor of the vehicle and each including an opening. The apparatus also comprises a pair of upper rails fixed to the seat of the vehicle and held by the lower rails through the openings and comprises a pair of flexible bellows. One end of each bellows is mounted to the upper rail and the other end is mounted to the lower rail. The bellows cover the openings and prevent a foot of the passenger from falling in the openings of the lower rails.

However the bellows of the apparatus are not attractive. Also the bellows do not have sufficient strength to be used for protection of the lower rails.

SUMMARY OF THE PRESENT INVENTION

It is an object of the present invention to provide a seat sliding apparatus which comprises attractive looking protection and possesses sufficient strength and durability.

It is another object of the present invention to provide a seat sliding apparatus possessing sufficient strength to prevent the upper rails from parting from the lower rails.

It is a further object of the present invention to provide an automatic seat sliding apparatus which comprises attractive looking protection and possesses sufficient strength.

To achieve the above mentioned object, this invention provides a seat sliding apparatus for mounting a seat of a vehicle, comprising: a pair of lower rails for fixing to a floor of the vehicle, each of said lower rails including an opening; a pair of upper rails for fixing to the seat of the vehicle and held slidably by the pair of lower rails through the openings; and a pair of plate members respectively fixed to the lower rails, each said plate member covering at least a portion of each of said opening.

BRIEF DESCRIPTION OF THE DRAWINGS

The features and advantages of the seat sliding apparatus according to the present invention will be more clearly appreciated from the following description in conjunction with the accompanying drawings wherein:

FIG. 4 is an enlarged perspective view which illustrates the internal parts of a rear end of the embodiment shown in FIG. 2.

DETAILED DESCRIPTION OF A PREFERRED EMBODIMENTS OF THE INVENTION

Figure 1:
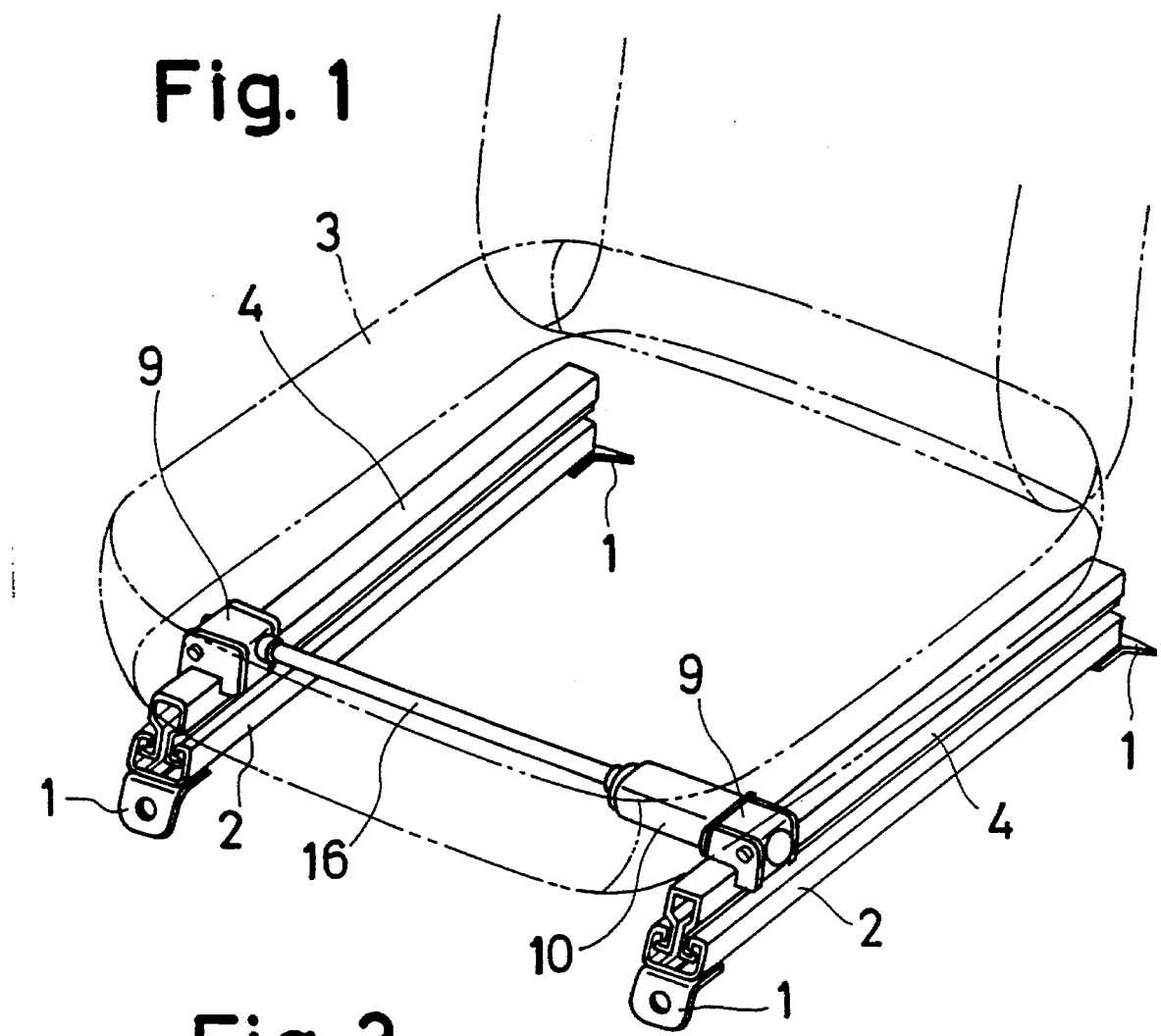
FIG. 1 is a whole view of a seat sliding apparatus for a vehicle of the present invention.

FIG. 1 shows a seat sliding apparatus comprising a pair of lower rails 2 respectively mounted to a floor (not shown in the FIGURES) of a vehicle at brackets 1. The seat sliding apparatus comprises a pair of upper rails 4 respectively fixed to a seat 3 and held slidably by the lower rails 2.

Figure 3:
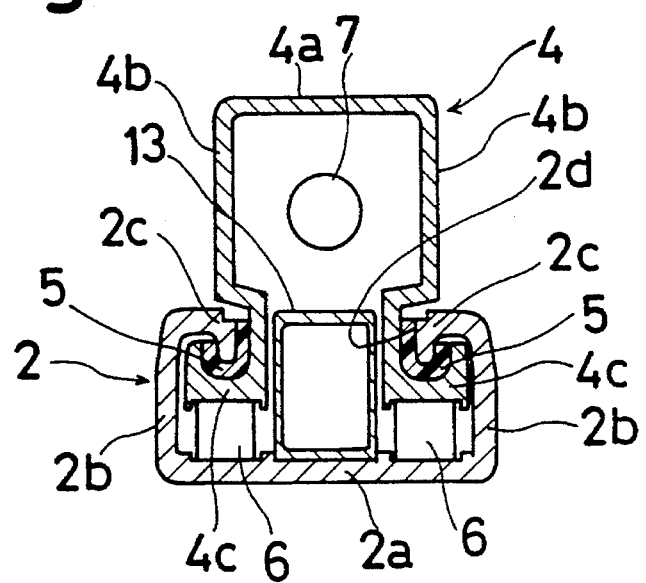
FIG. 3 is a sectional view taken on line 3-3 of FIG. 2.
Figure 2:
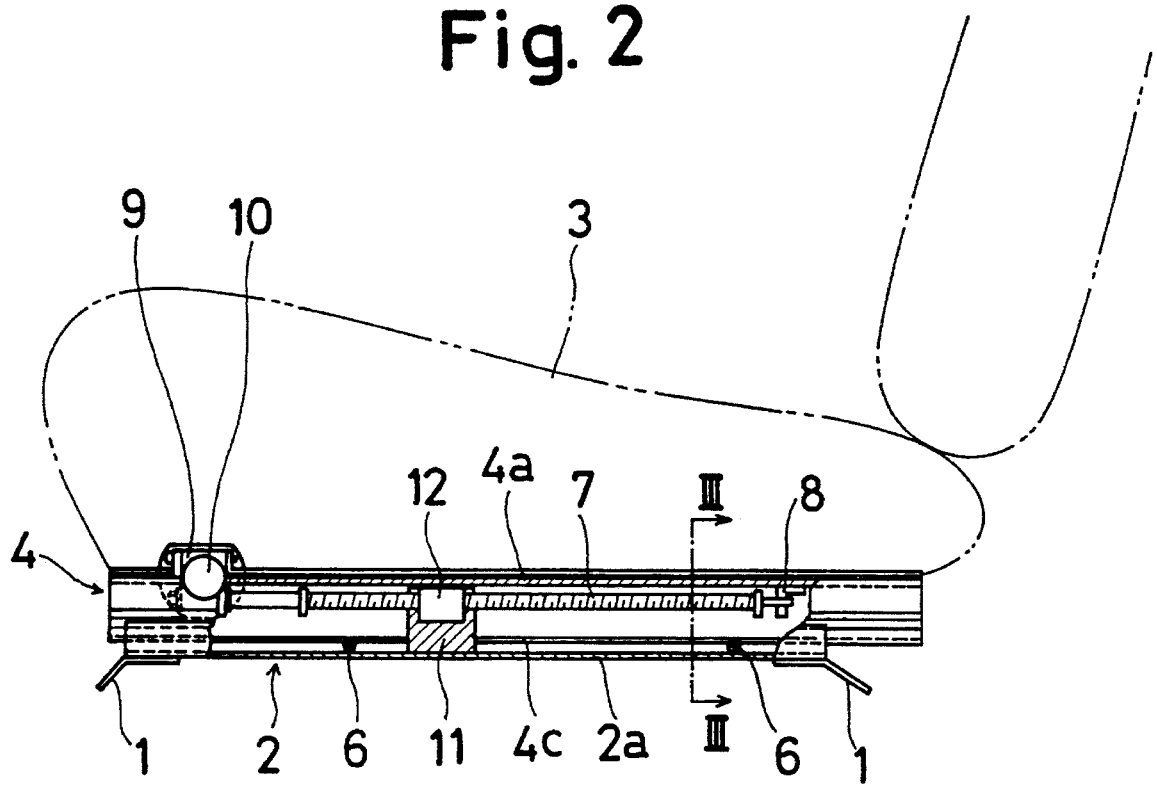
FIG. 2 is a side view of a seat sliding apparatus shown FIG. 1.

In FIG. 2 and FIG. 3 each of the lower rails 2 is formed into an U-shaped configuration including a bottom portion 2a and side portions 2b. Each of the lower rails 2 comprises a pair of flange portions 2c respectively curving inwardly and extending downward and which are disposed on the upper end of each of the side portions 2b. Each of the upper rails 4 is formed into an U-shaped configuration including a roof portion 4a and side portions 4b. Each of the upper rails 4 comprises a pair of flange portions 4c respectively curving outwardly and extending upward, thereby having a hook-shape, and which are disposed under the lower end of each of the side portions 4b. Each of the flange portions 4c is inserted into an inside of the lower rail 2 from an opening 2d disposed between the flange portions 2c. The flange portions 4c of the upper rail 4 are respectively engaged with the flange portions 2c of the lower rail 2 by the medium of a pair of shoes 5. Each of a pair of rollers 6 is disposed between the flange portion 4c of the upper rail 4 and the bottom portion 2a of the lower rail 2. A screw 7 is disposed rotatably at the inside of one of the upper rail 4. One end of the screw 7 is rotatably mounted to the roof portion 4a of the upper rail 4 at a bracket 8 and the other end is connected to an electric motor 10 by a gear box 9. The gear box 9 and the electric motor 10 are fixed to the roof portion 4a of the upper rail 4. A nut member 12 engaging with the screw 7 is fixed to the bottom portion 2a of the lower rail 2 by the medium of a mounting member 11. The other upper rail 4 comprises the screw 7, the nut member 12 and the gear box 9 in the same way. The electric motor 10 is connected to the gear box 9 mounted to the other upper rail 4 through a connecting shaft 16.

As shown in FIGS. 3 and 4 a plate member 13 is formed to have a cross section with a substantially rectangular configuration and inserted to the rear end portion of the opening 2d of the lower rail 2. The plate member 13 is disposed on the bottom portion 2a fixedly by a plurality of bolts 14 and covers the rear end portion of the opening 2d of the lower rail 2. A covering member 15 is fixed to the rear end of the lower rail 2 and covers the rear end of the lower rail 2 and the bracket 1. The side portion 4b is inserted between the plate member 13 and the lower member 2. The covering member 15 includes slots 15a in which the side portion 4b and the flange portion 4c of the upper rail 4 are fitted. In the above mentioned structure the plate member 13 covers the opening 2d as a protection and prevents a foot of the passenger from falling in the openings 2d of the lower rail 2. The plate member 13 can be formed of all sorts of materials. Therefore the plate member 13 is attractive and possesses sufficient strength and durability resulting from the plate member 13 being made of the same material as the lower rail 2 or the upper rail 4. Furthermore the plate member 13 can be provided as a stopper which delimits the sliding stroke of the upper rail 4 against the lower rail 2.

Figure 5:
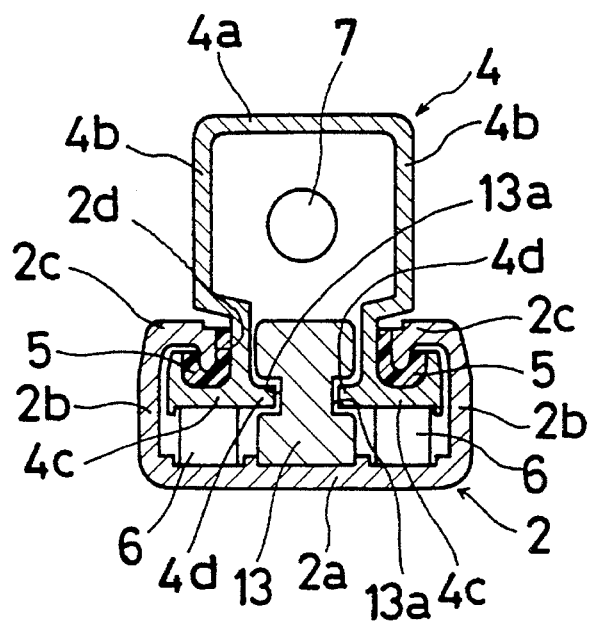
FIG. 5 is a sectional view, corresponding to FIG. 3, of an alternative embodiment of the invention.

An alternative embodiment of the seat sliding apparatus of the invention shown in FIG. 5 comprises the upper rail which includes a pair of projecting portions 4d and the plate member 13 which comprises a pair of slits 13a engaging with the projecting portions 4d. The seat sliding apparatus possesses the strength enough to prevent the upper rails 4 from parting from the lower rails 2 because of the engaging of the upper rails 4 with the plate members 13 fixed to the lower rails 2.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A seat sliding apparatus for mounting a seat of a vehicle, comprising:

a pair of lower rails for fixing to a floor of the vehicle, each of the lower rails including a pair of side walls defining therebetween an upward-facing opening along a length thereof;

a pair of upper rails for fixing to the seat of the vehicle, and held slidably by the pair of lower rails through the respective openings; and a pair of plate members respectively positioned within said openings and fixed to the lower rails, each said plate member including a substantially flat upper portion, wherein the upper portion of each said plate member substantially closes a respective one of said openings in order that said openings are not visible, each of the plate members having a substantially rectangular cross section;

wherein each of the upper rails includes a pair of flange portions at a lower end thereof; and further comprising:

a plurality of rollers disposed between each of the flange portions of each of the upper rails and a bottom portion of each of the lower rails.

2. A seat sliding apparatus for mounting a seat of a vehicle, comprising:

a pair of lower rails for fixing to a floor of the vehicle, each of the lower rails including an upward-facing opening along a length thereof;

a pair of upper rails for fixing to the seat of the vehicle and held slidably by the pair of lower rails through the openings, each of the upper rails including a pair of flange portions at a lower end thereof;

a plurality of rollers disposed between each of the flange portions of each of the upper rails and a bottom portion of each of the lower rails; and a pair of plate members respectively positioned within said openings and fixed to the lower rails, each said plate member including a substantially flat upper portion, wherein each said plate member closes at least a portion of each of said openings in order that said openings are not visible, each of the plate members having a substantially rectangular cross section.

3. A seat sliding apparatus for mounting a seat of a vehicle, comprising:

a pair of lower rails for fixing to a floor of the vehicle, each of the lower rails including an upward-facing opening along a length thereof;

a pair of upper rails for fixing to the seat of the vehicle and held slidably by the pair of lower rails through the openings, each of the upper rails including a pair of flange portions at a lower end thereof;

roller means for assisting movement of each of the upper rails along the corresponding lower rail and disposed between and in contact with the flange portions of each upper rail and a bottom portion of each corresponding lower rail; and a pair of plate members respectively positioned within the openings and fixed to the lower rails, wherein each of the plate members include a substantially flat upper planar portion spaced above the bottom portion of a respective one of the lower rails, and wherein the flat upper portion of each of the plate members closes at least a portion of a respective one of said openings in order that said openings are not visible.

4. A seat sliding apparatus in accordance with claim 3, wherein the roller means includes a plurality of rollers.

5. A seat sliding apparatus in accordance with claim 3, wherein each of the plate members is substantially rectangular in cross section.

* * * * *